United States Patent
Hudzia et al.

(10) Patent No.: US 9,747,051 B2
(45) Date of Patent: Aug. 29, 2017

(54) CLUSTER-WIDE MEMORY MANAGEMENT USING SIMILARITY-PRESERVING SIGNATURES

(71) Applicant: Strato Scale Ltd., Herzlia (IL)

(72) Inventors: Benoit Guillaume Charles Hudzia, Belfast (GB); Rom Freiman, Givataim (IL)

(73) Assignee: STRATO SCALE LTD., Herzliya (IL)

( * ) Notice: Subject to any disclaimer, the term of this patent is extended or adjusted under 35 U.S.C. 154(b) by 64 days.

(21) Appl. No.: 14/672,466

(22) Filed: Mar. 30, 2015

(65) Prior Publication Data
US 2015/0286442 A1    Oct. 8, 2015

(51) Int. Cl.
| G06F 12/00 | (2006.01) |
| G06F 13/00 | (2006.01) |
| G06F 13/28 | (2006.01) |
| G06F 3/06 | (2006.01) |
| G06F 12/1018 | (2016.01) |

(52) U.S. Cl.
CPC .......... G06F 3/0622 (2013.01); G06F 3/067 (2013.01); G06F 3/0631 (2013.01); G06F 3/0641 (2013.01); G06F 12/1018 (2013.01); G06F 2212/657 (2013.01)

(58) Field of Classification Search
CPC ........... G06F 12/1018; G06F 2212/657; G06F 3/0622; G06F 3/0631; G06F 3/0641; G06F 3/067
USPC .................................................. 711/170
See application file for complete search history.

(56) References Cited

U.S. PATENT DOCUMENTS

| 5,159,667 | A | * | 10/1992 | Borrey ............ G06F 17/30011 382/171 |
| 6,148,377 | A | | 11/2000 | Carter et al. |
| 6,591,355 | B2 | | 7/2003 | Schuster et al. |
| 6,823,429 | B1 | | 11/2004 | Olnowich |
| 6,880,102 | B1 | | 4/2005 | Bridge |
| 7,162,476 | B1 | | 1/2007 | Belair et al. |
| 7,421,533 | B2 | | 9/2008 | Zimmer et al. |
| 7,913,046 | B2 | | 3/2011 | Kamay et al. |
| 8,082,400 | B1 | | 12/2011 | Chang et al. |
| 8,266,238 | B2 | | 9/2012 | Zimmer et al. |
| 8,352,940 | B2 | | 1/2013 | Pafumi et al. |

(Continued)

FOREIGN PATENT DOCUMENTS

WO    2009033074 A2    3/2009

OTHER PUBLICATIONS

International Application # PCT/IB2015/052179 Search report dated Sep. 16, 2015.

(Continued)

*Primary Examiner* — Sheng-Jen Tsai
(74) *Attorney, Agent, or Firm* — D.Kligler IP Services Ltd.

(57) ABSTRACT

A method includes, in a computing system that includes one or more compute nodes that run clients, defining memory chunks, each memory chunk including multiple memory pages accessed by a respective client. Respective similarity-preserving signatures are computed for one or more of the memory chunks. Based on the similarity-preserving signatures, an identification is made that first and second memory chunks differ in content in no more than a predefined number of memory pages with at least a predefined likelihood. Efficiency of access to the identified first and second memory chunks is improved.

15 Claims, 3 Drawing Sheets

(56) References Cited

U.S. PATENT DOCUMENTS

| | | | |
|---|---|---|---|
| 8,544,004 B2 | 9/2013 | Fultheim et al. | |
| 8,671,445 B1 | 3/2014 | Wang et al. | |
| 8,782,003 B1* | 7/2014 | Patterson | G06F 17/30144 |
| | | | 707/624 |
| 8,818,951 B1 | 8/2014 | Muntz et al. | |
| 8,943,260 B2 | 1/2015 | Ben-Yehuda et al. | |
| 9,183,035 B2 | 11/2015 | Bacher et al. | |
| 2002/0143868 A1 | 10/2002 | Challenger et al. | |
| 2003/0212869 A1 | 11/2003 | Burkey | |
| 2004/0153615 A1 | 8/2004 | Koning et al. | |
| 2006/0053139 A1 | 3/2006 | Marzinski et al. | |
| 2006/0059242 A1 | 3/2006 | Blackmore et al. | |
| 2006/0059282 A1 | 3/2006 | Chaudhary et al. | |
| 2006/0143389 A1 | 6/2006 | Kilian et al. | |
| 2006/0155674 A1* | 7/2006 | Traut | G06F 8/61 |
| 2006/0155946 A1 | 7/2006 | Ji | |
| 2006/0184652 A1* | 8/2006 | Teodosiu | H03M 7/30 |
| | | | 709/221 |
| 2006/0248273 A1 | 11/2006 | Jernigan, IV et al. | |
| 2007/0033375 A1* | 2/2007 | Sinclair | G06F 12/0246 |
| | | | 711/203 |
| 2008/0294696 A1 | 11/2008 | Frandzel | |
| 2009/0049259 A1 | 2/2009 | Sudhakar | |
| 2009/0049271 A1* | 2/2009 | Schneider | G06F 9/5016 |
| | | | 711/206 |
| 2009/0055447 A1 | 2/2009 | Sudhakar | |
| 2009/0204636 A1* | 8/2009 | Li | G06F 17/30097 |
| 2009/0204718 A1* | 8/2009 | Lawton | G06F 9/5016 |
| | | | 709/230 |
| 2009/0304271 A1* | 12/2009 | Takahashi | G06T 7/0081 |
| | | | 382/165 |
| 2009/0307435 A1 | 12/2009 | Nevarez et al. | |
| 2009/0307462 A1 | 12/2009 | Fleming et al. | |
| 2010/0017625 A1* | 1/2010 | Johnson | G06F 12/1416 |
| | | | 713/190 |
| 2010/0077013 A1* | 3/2010 | Clements | G06F 17/30156 |
| | | | 707/822 |
| 2010/0211547 A1 | 8/2010 | Kamei et al. | |
| 2010/0281208 A1* | 11/2010 | Yang | G06F 3/0611 |
| | | | 711/103 |
| 2011/0055471 A1* | 3/2011 | Thatcher | G06F 3/0608 |
| | | | 711/114 |
| 2011/0066668 A1 | 3/2011 | Guarraci | |
| 2011/0072234 A1 | 3/2011 | Chinya et al. | |
| 2011/0271070 A1 | 11/2011 | Worthington et al. | |
| 2012/0005207 A1* | 1/2012 | Gulhane | G06F 17/30867 |
| | | | 707/737 |
| 2012/0011504 A1 | 1/2012 | Ahmad et al. | |
| 2012/0130848 A1* | 5/2012 | Shishido | G06Q 30/0631 |
| | | | 705/26.7 |
| 2012/0131259 A1* | 5/2012 | Baskakov | G06F 12/109 |
| | | | 711/6 |
| 2012/0158709 A1* | 6/2012 | Gaonkar | G06F 17/30156 |
| | | | 707/723 |
| 2012/0192203 A1 | 7/2012 | Corry et al. | |
| 2012/0210042 A1 | 8/2012 | Lim et al. | |
| 2012/0233425 A1* | 9/2012 | Yueh | G06F 3/0608 |
| | | | 711/162 |
| 2012/0272238 A1 | 10/2012 | Baron | |
| 2012/0317331 A1 | 12/2012 | Broas | |
| 2012/0324181 A1 | 12/2012 | Garthwaite et al. | |
| 2013/0080408 A1 | 3/2013 | Cashman et al. | |
| 2013/0179381 A1* | 7/2013 | Kawabata | G06F 17/30144 |
| | | | 706/46 |
| 2013/0212345 A1 | 8/2013 | Nakajima | |
| 2013/0249925 A1 | 9/2013 | Ginzburg | |
| 2013/0275705 A1 | 10/2013 | Schenfeld et al. | |
| 2013/0326109 A1 | 12/2013 | Kivity | |
| 2013/0339568 A1 | 12/2013 | Corrie | |
| 2014/0115252 A1 | 4/2014 | Yu | |
| 2014/0244952 A1 | 8/2014 | Raj et al. | |
| 2014/0280664 A1 | 9/2014 | Sengupta et al. | |
| 2014/0365708 A1 | 12/2014 | Iwata et al. | |
| 2015/0039838 A1 | 2/2015 | Tarasuk-Levin et al. | |
| 2015/0089010 A1 | 3/2015 | Tsirkin et al. | |
| 2015/0286414 A1* | 10/2015 | Gordon | G06F 12/1081 |
| | | | 711/159 |
| 2017/0031779 A1 | 2/2017 | Helliker et al. | |

OTHER PUBLICATIONS

U.S. Appl. No. 14/333,521Office Action dated Nov. 27, 2015.
U.S. Appl. No. 14/260,304 Office Action dated Dec. 10, 2015.
U.S. Appl. No. 14/181,791 Office Action dated Feb. 12, 2016.
International Application #PCT/IB2015/057658 Search Report dated Jan. 12, 2016.
International Application #PCT/IB2015/057235 Search Report dated Dec. 29, 2015.
Amit et al., "VSWAPPER: A Memory Swapper for Virtualized Environments", Proceedings of the 19th International Conference on Architectural Support for Programming Languages and Operating Systems (AISPLOS'14), pp. 349-366, Salt Lake City, USA, Mar. 1-4, 2014.
Gupta et al., "Difference Engine: Harnessing Memory Redundancy in Virtual Machines", 8th USENIX Symposium on Operating Systems Design and Implementation, pp. 309-322, year 2010.
Heo et al., "Memory overbooking and dynamic control of Xen virtual machines in consolidated environments", Proceedings of the 11th IFIP/IEE International Conference on Symposium on Integrated Network Management, pp. 630-637, year 2009.
Waldspurger., "Memory Resource Management in VMware ESX Server", Proceedings of the 5th Symposium on Operating Systems Design and Implementation, 14 pages, Dec. 9-11, 2002.
Wood et al., "Memory Buddies: Exploiting Page Sharing for Smart Colocation in Virtualized Data Centers", Proceedings of the 2009 ACM SIGPLAN/SIGOPS International Conference on Virtual Execution Environments, pp. 31-40, Washington, USA, Mar. 11-13, 2009.
Gordon et al., "Ginkgo: Automated, Application-Driven Memory Overcommitment for Cloud Computing", ASPLOS's RESoLVE workshop, 6 pages, year 2011.
Zhao et al., "Dynamic memory balancing for virtual machines", Proceedings of the 2009 ACM SIGPLAN/SIGOPS International Conference on Virtual Execution Environments pp. 21-30, Washington, USA, Mar. 11-13, 2009.
Hines et al., "Applications Know Best: Performance-Driven Memory Overcommit with Ginkgo", IEEE 3rd International Conference on Cloud Computing Technology and Science, pp. 130-137, Nov. 29-Dec. 1, 2011.
International Application #PCT/IB2015/058841 Search Report dated Feb. 28, 2016.
VMWARE Inc., "Understanding Memory Resource Management in VMware vSphere® 5.0", Technical Paper, 29 pages, year 2011.
U.S. Appl. No. 14/260,304 Office Action dated May 25, 2016.
International Application # PCT/IB2016/050396 Search Report dated Mar. 13, 2016.
Roussev, V., "Data Fingerprinting with Similarity Digests", Advances in Digital Forensics VI, Chapter 8, IFIP Advances in Information and Communication Technology, vol. 337, 20 pages, 2010.
Ben-Yehuda et al, U.S. Appl. No. 14/181,791, filed Feb. 17, 2014.
Ben-Yehuda et al, U.S. Appl. No. 14/260,304, filed Apr. 24, 2014.
Zivan, O., U.S. Appl. No. 14/333,521, filed Jul. 17, 2014.
Mitzenmacher et al., "The Power of Two Random Choices: Survey of Techniques and Results", Handbook of Randomized Computing, pp. 255-312, year 2000.
Hudzua et al., "Memory Aggregation for KVM", 41 pages, KVM forum, Nov. 2012.
VMware Virtualization, 8 pages, year 2014.
Hilland et al, RDMA Protocol Verbs Specification, version 1.0, 243 pages, Apr. 2003.
Recio et al, "Remote Direct Memory Access Protocol Specification," RFC 5040, Network Working Group ,57 pages, Oct. 2007.
Gordon et al, U.S. Appl. No. 14/543,920, filed Nov. 18, 2014.
Traeger, U.S. Appl. No. 14/538,848, filed Nov. 12, 2014.
Gordon et al, U.S. Appl. No. 14/797,201, filed Jul. 13, 2015.

(56) References Cited

OTHER PUBLICATIONS

International Application # PCT/IB2014/067327 Search report dated May 20, 2015.
International Application # PCT/IB2014/067328 Search report dated May 18, 2015.
International Application # PCT/IB2015/050937 Search report dated Jun. 28, 2015.
International Application # PCT/IB2015/052177 Search report dated Jul. 19, 2015.
Lazar et al., U.S. Appl. No. 14/594,188, filed Jan. 12, 2015.
U.S. Appl. No. 14/543,920 Office Action dated Nov. 18, 2016.
U.S. Appl. No. 14/594,188 Office Action dated Apr. 5, 2017.
U.S. Appl. No. 14/181,791 Office Action dated Jun. 28, 2017.

* cited by examiner

CLUSTER-WIDE MEMORY MANAGEMENT USING SIMILARITY-PRESERVING SIGNATURES

CROSS-REFERENCE TO RELATED APPLICATIONS

This application claims the benefit of U.S. Provisional Patent Application 61/974,475, filed Apr. 3, 2014, whose disclosure is incorporated herein by reference.

FIELD OF THE INVENTION

The present invention relates generally to computing systems, and particularly to methods and systems for memory management in computing systems.

SUMMARY OF THE INVENTION

An embodiment of the present invention that is described herein provides a method including, in a computing system that includes one or more compute nodes that run clients, defining memory chunks, each memory chunk including multiple memory pages accessed by a respective client. Respective similarity-preserving signatures are computed for one or more of the memory chunks. Based on the similarity-preserving signatures, an identification is made that first and second memory chunks differ in content in no more than a predefined number of memory pages with at least a predefined likelihood. Efficiency of access to the identified first and second memory chunks is improved.

In some embodiments, computing a similarity-preserving signature for a memory chunk includes computing a set of page signatures over the respective memory pages of the memory chunk. Identifying that the first and second memory chunks differ in content in no more than a predefined number of memory pages with at least the predefined likelihood may include identifying that the similarity-preserving signatures of the first and second memory chunks differ in no more than a given number of page signatures.

In some embodiments, improving the efficiency of access includes finding in the first and second memory chunks respective first and second memory pages that have identical content, and deduplicating the first and second memory pages. Finding the first and second memory pages that have the identical content may include comparing respective first and second hash values computed over the first and second memory pages.

In an embodiment, improving the efficiency of access includes placing first and second clients, which respectively access the first and second memory chunks, on a same compute node. In an alternative embodiment, improving the efficiency of access includes placing first and second clients, which respectively access the first and second memory chunks, on first and second compute nodes that are topologically adjacent to one another in the computing system.

In another embodiment, improving the efficiency of access includes placing the first and second memory chunks on a same compute node or on first and second compute nodes that are topologically adjacent to one another in the computing system. In yet another embodiment, defining the memory chunks includes classifying the memory pages into active and inactive memory pages, and including in the memory chunks only the inactive memory pages.

There is additionally provided, in accordance with an embodiment of the present invention, a computing system including one or more compute nodes that include respective memories and respective processors. The processors are configured to run clients that access memory pages stored in the memories, to define memory chunks, each memory chunk including multiple memory pages accessed by a respective client, to compute respective similarity-preserving signatures for one or more of the memory chunks, to identify, based on the similarity-preserving signatures, that first and second memory chunks differ in content in no more than a predefined number of memory pages with at least a predefined likelihood, and to improve efficiency of access to the identified first and second memory chunks.

There is also provided, in accordance with an embodiment of the present invention, a computer software product, the product including a tangible non-transitory computer-readable medium in which program instructions are stored, which instructions, when read by one or more processors of respective compute nodes, cause the processors to run clients that access memory pages stored in memories of the compute nodes, to define memory chunks, each memory chunk including multiple memory pages accessed by a respective client, to compute respective similarity-preserving signatures for one or more of the memory chunks, to identify, based on the similarity-preserving signatures, that first and second memory chunks differ in content in no more than a predefined number of memory pages with at least a predefined likelihood, and to improve efficiency of access to the identified first and second memory chunks.

The present invention will be more fully understood from the following detailed description of the embodiments thereof, taken together with the drawings in which:

DETAILED DESCRIPTION OF EMBODIMENTS

Overview

Figure 1:
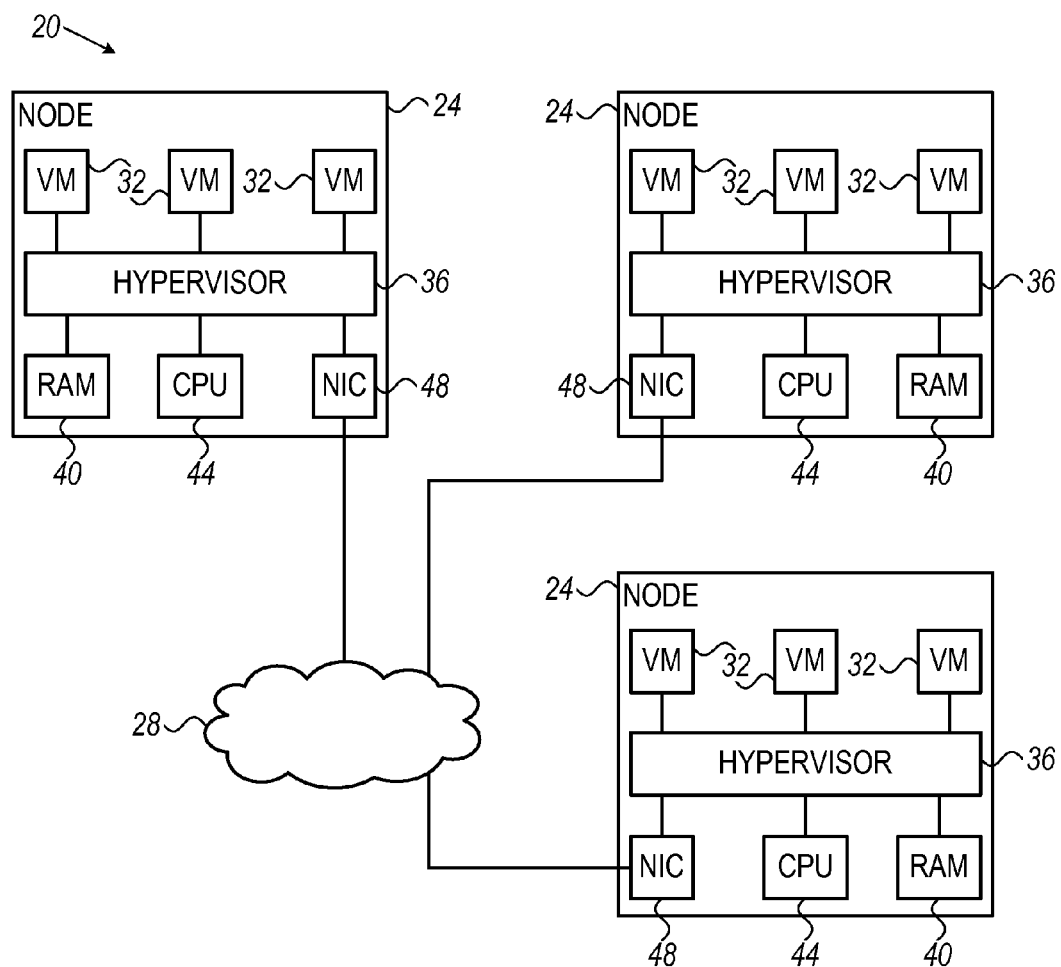
FIG. 1 is a block diagram that schematically illustrates a computing system, in accordance with an embodiment of the present invention.

Embodiments of the present invention that are described herein provide improved methods and systems for managing memory resources in computing systems. In the disclosed embodiments, a computing system comprises one or more compute nodes that run clients, e.g., applications, Virtual Machines (VMs) or operating-system processes.

The memory space is typically split into equal-size units referred to as memory pages. The clients access content stored in memory by locating the appropriate memory page or pages and the accessing the content stored therein. Clients may access memory pages stored either on the same node or on other nodes.

The system identifies situations in which different clients access groups or ranges of memory pages, referred to herein as chunks, which are similar in content to one another. For example, the system may correlate various events and identify the patterns in which clients access groups or ranges of memory pages. By proper clustering, the system is able to improve storage efficiency and overall performance. For example, the system may de-duplicate memory pages that belong to different chunks but have identical content, or relocate clients that use similar memory chunks to the same compute node or to nearby nodes.

Each memory chunk comprises a plurality of memory pages, not necessarily contiguous, used by a certain client. Memory chunks are typically regarded as similar if they likely, with at least a certain likelihood, to differ in content by no more than a predefined number of memory pages. In order to identify similar memory chunks, the system computes and stores for each memory chunk a respective chunk signature that preserves the similarity property. In one embodiment, the chunk signature comprises a list of short page signatures that are computed over the respective memory pages of the chunk. Chunks are considered similar if their chunk signatures (page-signature lists) are likely to differ by no more than a given number of page signatures.

In a typical embodiment, the chunk similarity mechanism is implemented in addition to a mechanism for identifying exact matches between memory pages having the same content. For example, the system may compute and store a respective hash value over each memory page (not to be confused with the page signature that is part of the chunk signature). In an example deduplication process, the system may first identify similar memory chunks (using the chunk signatures), and then search within the similar chunks (using the hash values) for identical memory pages to be deduplicated.

In this deduplication process, the chunk similarity mechanism is used as a fast and computationally-efficient way of identifying memory ranges that are likely to contain large numbers of duplicate memory pages. The disclosed deduplication process is highly scalable and may be performed at various levels of the system, e.g., between applications or processes of a given VM, within VMs on a given compute node, or across an entire compute-node cluster.

As such, the methods and systems described herein are especially advantageous in large-scale compute-node clusters whose total memory size is on the order of hundreds of terabytes or more. Nevertheless, the disclosed techniques are applicable in small-scale computing systems, as well.

System Description

FIG. 1 is a block diagram that schematically illustrates a computing system 20, which comprises a cluster of multiple compute nodes 24, in accordance with an embodiment of the present invention. System 20 may comprise, for example, a data center, a cloud computing system, a High-Performance Computing (HPC) system or any other suitable system.

Compute nodes 24 (referred to simply as "nodes" for brevity) typically comprise servers, but may alternatively comprise any other suitable type of compute nodes. System 20 may comprise any suitable number of nodes, either of the same type or of different types. In some of the disclosed techniques, the system may even comprise a single compute node. Nodes 24 are connected by a communication network 28, typically a Local Area Network (LAN). Network 28 may operate in accordance with any suitable network protocol, such as Ethernet or Infiniband.

Each node 24 comprises a Central Processing Unit (CPU) 44, also referred to as a processor. Depending on the type of compute node, CPU 44 may comprise multiple processing cores and/or multiple Integrated Circuits (ICs). Regardless of the specific node configuration, the processing circuitry of the node as a whole is regarded herein as the node CPU. Each node 24 further comprises a memory 40, typically a volatile Random Access Memory (RAM), and a Network Interface Card (NIC) 48 for communicating with network 28. Some of nodes 24 may comprise non-volatile storage devices such as magnetic Hard Disk Drives—HDDs—or Solid State Drives—SSDs (not shown in the figure).

Typically, each node 24 runs one or more clients. In the present example, the clients comprise Virtual Machines (VMs) 32, which are assigned physical resources of the node (e.g., CPU, memory and networking resources) by a hypervisor 36. Alternatively, however, clients may comprise, for example, user applications, operating-system processes or containers, or any other suitable type of client. The description that follows refers to VMs, for the sake of clarity, but the disclosed techniques can be used in a similar manner with any other suitable types of clients.

The system and compute-node configurations shown in FIG. 1 are example configurations that are chosen purely for the sake of conceptual clarity. In alternative embodiments, any other suitable system and/or node configuration can be used. The various elements of system 20, and in particular the elements of nodes 24, may be implemented using hardware/firmware, such as in one or more Application-Specific Integrated Circuit (ASICs) or Field-Programmable Gate Array (FPGAs). Alternatively, some system or node elements, e.g., CPUs 44, may be implemented in software or using a combination of hardware/firmware and software elements. In some embodiments, CPUs 44 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Memory Management Using Similarity-Preserving Signatures

In system 20, each VM accesses (e.g., reads and writes) memory pages that are stored in memory 40 of the node 24 that runs the VMs and/or in memory 40 of one or more other nodes 24. In some embodiments, system 20 runs a Node Page Manager (NPM) process that manages the memory resources of system 20, and in particular carries out the techniques described herein. The NPM process, or simply NPM for brevity, may be implemented in a distributed manner by CPUs 44 of nodes 24, by a selected CPU 44, or by some centralized management node (not shown in the figure).

In some embodiments, the NPM groups memory pages used by the VMs into memory chunks, computes for each chunk a respective similarity-preserving chunk signature, and uses the chunk signatures for improving the efficiency of accessing similar memory chunks. Each memory chunk comprises a plurality of memory pages, not necessarily contiguous, used by a certain VM 32. In one embodiment, each page is 4 KB in size and each memory chunk is 128 MB in size. Alternatively, any other suitable chunk size may be used. The chunk size need not necessarily be uniform or constant.

In some embodiments the NPM groups all the memory pages of a given VM into chunks. Alternatively, however, the NPM may group into chunks only some of the memory pages of a VM. For example, for deduplication purposes the NPM may classify the memory pages of a VM into active pages (that are accessed frequently) and inactive pages (that are accessed rarely if at all), and group into chunks only the inactive pages.

For each chunk, the NPM computes and stores a respective chunk signature. The chunk signature is also referred to as a similarity-preserving signature, because comparison between the chunk signatures of different chunks is indicative of the extent of similarity between the contents of the chunks. Typically, the NPM regards memory chunks as similar if they differ in content by no more than a predefined number of memory pages, with at least a predefined likelihood. In some embodiments the predefined likelihood is 1, i.e., the similarity is deterministic rather than statistical.

In different embodiments, the NPM may use various kinds of chunk signatures. The "similarity-preservation" property typically means that, if two chunks are similar, i.e., differ in content in no more than a predefined number of memory pages, their chunk signatures will be close to one another by at least a predefined amount with at least a predefined probability. In addition, if two chunks are dissimilar, i.e., differ in content in more than a given number of memory pages, their chunk signatures will be distant from one another by at least a given amount with at least a given probability. A good chunk signature is typically fast to compute and compare, and occupies a small amount of memory.

In one embodiment, the chunk signature comprises a list of short page signatures that are computed over the respective memory pages of the chunk. The NPM regards chunks as similar if their chunk signatures (page-signature lists) are likely to differ by no more than a given number of page signatures, and vice versa. Each page signature may comprise a short hash value computed over the respective page content.

Typically, the size of the page signature is smaller than the size of the hash values used for exact match detection of page content, because the former have less stringent accuracy requirements. The page hash values should represent the page content with very high probability, because they are used for actual deduplication decisions. The chunk signatures, on the other hand, are used for pointing the NPM to memory areas that are likely to contain a large number of duplicate pages (which will then be compared and de-duplicated using the accurate page hash values).

In an example embodiment, each page signature in the chunk signature is four bytes in size, while each page hash value is twenty bytes in size. Alternatively, however, any other suitable sizes can be used.

The NPM may compute the page signatures using any suitable computation scheme, for example using a sliding window and a rolling hash function. One possible example of a rolling hash function is the Karp-Rabin signature. Alternatively, however, any other suitable similarity-preserving hash function can be used. Example techniques are described, for example, by Martinez et al., in "State of the Art in Similarity Preserving Hashing Functions," Proceedings of the 2014 International Conference on Security and Management, July, 2014; and by Yu et al., in "Error-Correcting Output Hashing in Fast Similarity Search," Proceedings of the Second International Conference on Internet Multimedia Computing and Service, December, 2010, which are incorporated herein by reference.

Figure 2:
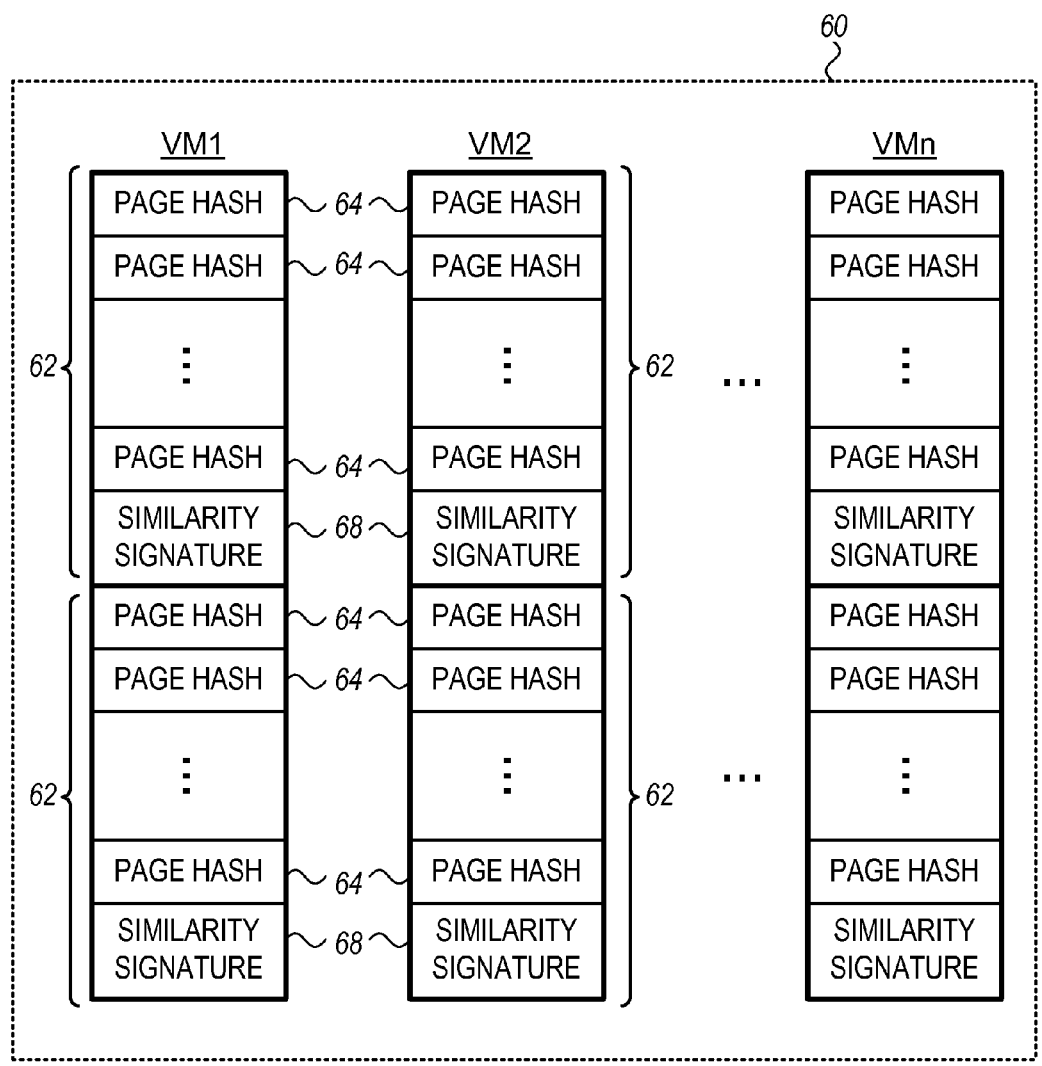
FIG. 2 is a diagram that schematically illustrates a memory-management data structure, in accordance with an embodiment of the present invention.

FIG. 2 is a diagram that schematically illustrates a memory-management data structure 60, in accordance with an embodiment of the present invention. Data structure 60 is used by the NPM in performing various management processes that use the disclosed similarity-preserving chunk signatures.

For each VM 32, data structure 60 comprises one or more entries 62, each specifying a respective memory chunk. Each entry 62 comprises multiple page hash values 64 computed over the respective pages of the chunk, and a similarity-preserving chunk signature 68. In the present example, chunk signature 68 comprises a list of short page signatures.

Data structure 60 may be centralized or distributed over multiple nodes, depending on the implementation of the NPM process. In one embodiment, each node 24 computes page hash values 64 and chunk signature 68 for the memory pages and memory chunks used by its VMs. Each node shares this information with the cluster, so that the NPM process is able to access the entire data structure 60.

Example Memory Management Methods Using Similarity-Preserving Chunk Signatures

The NPM process may use the chunk signatures described herein for various management purposes. Typically, the chunk signatures are used as a fast and effective pre-screening tool that identifies memory regions that are likely to contain large numbers of duplicate memory pages.

Figure 3:
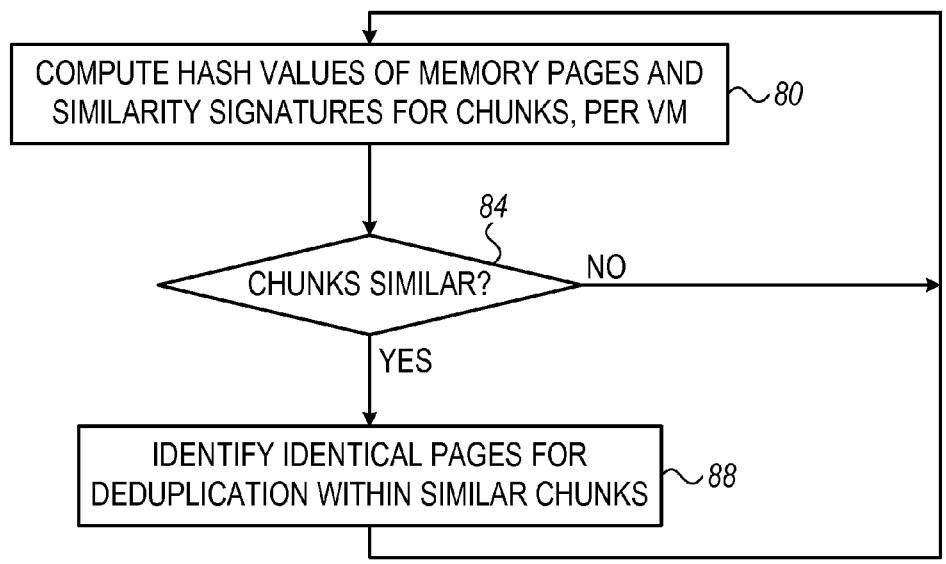
FIG. 3 is a flow chart that schematically illustrates a method for memory deduplication, in accordance with an embodiment of the present invention.

FIG. 3 is a flow chart that schematically illustrates a method for memory deduplication using chunk signatures, in accordance with an embodiment of the present invention. The method begins with the NPM computing page hash values 64 and chunk signature 68, per VM, at a signature computation step 80.

At a similarity detection step 84, the NPM looks for memory chunks that are similar to one another, based on their respective chunk signatures 68. If similar chunks are found, the NPM proceeds to de-duplicate at least some of the memory pages in the similar chunks, at a deduplication step 88. Typically, the NPM finds duplicate memory pages, i.e., corresponding pages in the similar chunks that have identical content, using page hash values 64. When using this method, the NPM focuses its deduplication efforts on similar chunks, in which the likelihood of finding duplicate pages is high.

As noted above, the deduplication process of FIG. 3 can be performed within a node ("intra-node") or across multiple nodes ("inter-node"). Inter-node deduplication can be performed, for example, using a distributed Bloom filter.

Figure 4:
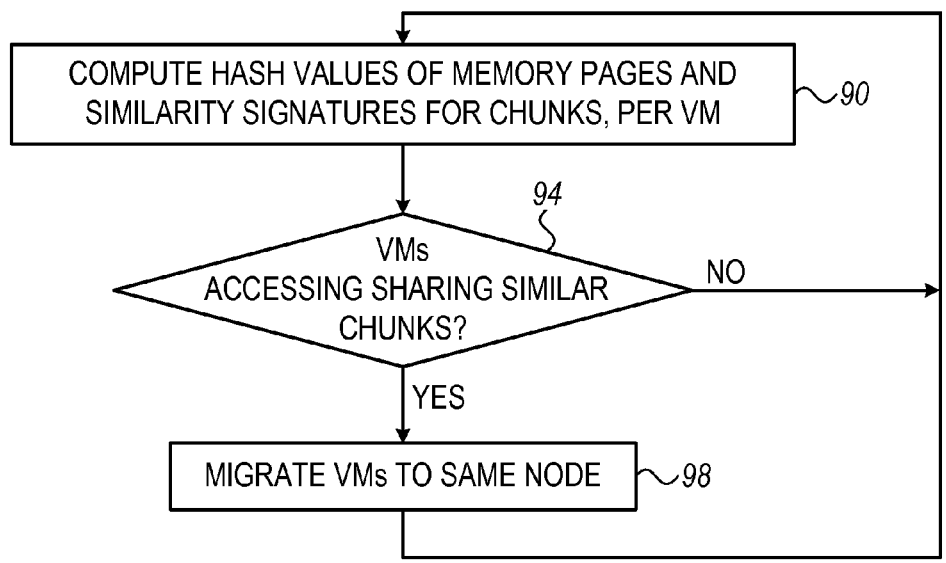
FIG. 4 is a flow chart that schematically illustrates a method for virtual-machine placement, in accordance with an embodiment of the present invention.

FIG. 4 is a flow chart that schematically illustrates a method for VM placement using chunk signatures, in accordance with another embodiment of the present invention. The method of FIG. 4 begins with the NPM computing page hash values 64 and chunk signature 68, per VM, at a signature calculation step 90.

At a VM checking step 94, the NPM identifies VMs that access similar memory chunks. If such VMs are found, the NPM migrates one or more of them so that, after migration, the VMs are located on the same compute node.

Locating VM that access similar memory chunks on the same node is advantageous for several reasons. For example, deduplication can be performed within the node and not between nodes. Moreover, locating more pages locally at the same node as the accessing VM reduces latency and communication overhead.

In an alternative embodiment, the NPM may not necessarily migrate the VMs (that access similar chunks) to the same node, but to nearby nodes. The term "nearby" in this context means that the nodes are topologically adjacent to one another in system 20, e.g., located less than a predefined number of network hops from one another.

In other embodiments, the NPM may migrate similar chunks to reside on the same node or at least on nearby nodes. Migration of chunks may be performed instead of or in addition to migration of VMs.

In alternative embodiments, the NPM may use the chunk signatures as a fast and memory-efficient means for producing a fingerprint or profile of the VM memory, e.g., using Bloom filters. VM memory fingerprints can be used for efficient comparison of VMs and identification of VMs that use similar content. Based on such identification, VMs can be placed and memory can be shared efficiently. VM placement based on such fingerprints can even be carried out without live VMs, by using fingerprints of previously-active VMs.

In some embodiments, the NPM may define a hierarchy, or nesting, of chunks. In such embodiments, chunks of a given size may be grouped into larger, higher-level chunks. Such a hierarchy enables the NPM to perform fast pruning of information.

Although the embodiments described herein mainly address management of volatile-memory resources, the methods and systems described herein can also be used in other applications, such as in managing persistent storage.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    in a computing system that includes a plurality of compute nodes that run clients, defining memory chunks, each memory chunk comprising multiple memory pages accessed by a respective client;
    computing respective similarity-preserving signatures for two or more of the memory chunks;
    identifying, based on the similarity-preserving signatures, memory chunks that differ in content in no more than a predefined number of memory pages with at least a predefined likelihood, and noting first and second clients on different computing nodes, accessing the identified memory chunks; and
    migrating the first client to the compute node hosting the second client or to a compute node topologically adjacent in the computing system to the compute node hosting the second client, responsively to identifying the memory chunks that differ in content in no more than a predefined number of memory pages with at least a predefined likelihood.

2. The method according to claim 1, wherein computing a similarity-preserving signature for a memory chunk comprises computing a set of page signatures over the respective memory pages of the memory chunk.

3. The method according to claim 2, wherein identifying memory chunks that differ in content in no more than a predefined number of memory pages with at least the predefined likelihood comprises identifying that the similarity-preserving signatures of the memory chunks differ in no more than a given number of page signatures.

4. The method according to claim 1, further comprising finding in the identified memory chunks respective first and second memory pages that have identical content, and deduplicating the first and second memory pages.

5. The method according to claim 4, wherein computing a similarity-preserving signature for a memory chunk comprises computing a set of page signatures over the respective memory pages of the memory chunk, and wherein finding the first and second memory pages that have the identical content comprises comparing respective first and second hash values, different from the page signatures, computed over the first and second memory pages.

6. The method according to claim 1, wherein defining the memory chunks comprises classifying the memory pages into active and inactive memory pages, and including in the memory chunks only the inactive memory pages.

7. A computing system, comprising a plurality of compute nodes that comprise respective memories and respective processors, wherein the processors are configured to run clients that access memory pages stored in the memories, to define memory chunks, each memory chunk comprising multiple memory pages accessed by a respective client, to compute respective similarity-preserving signatures for two or more of the memory chunks, to identify, based on the similarity-preserving signatures, memory chunks that differ in content in no more than a predefined number of memory pages with at least a predefined likelihood, and noting first and second clients on different computing nodes, accessing the identified memory chunks, and to migrate the first client to the compute node hosting the second client or to a compute node topologically adjacent in the computing system to the compute node hosting the second client, responsively to identifying the memory chunks that differ in content in no more than a predefined number of memory pages with at least a predefined likelihood.

8. The system according to claim 7, wherein the processors are configured to compute a similarity-preserving signature for a memory chunk by computing a set of page signatures over the respective memory pages of the memory chunk.

9. The system according to claim 8, wherein the processors are configured to identify that the memory chunks that differ in content in no more than a predefined number of memory pages with at least the predefined likelihood, by identifying that the similarity-preserving signatures of the memory chunks differ in no more than a given number of page signatures.

10. The system according to claim 7, wherein the processors are configured to find in the identified memory chunks respective first and second memory pages that have identical content, and to deduplicate the first and second memory pages.

11. The system according to claim 10, wherein the processors are configured to compute a similarity-preserving signature for a memory chunk by computing a set of page signatures over the respective memory pages of the memory chunk, and to find the first and second memory pages that have the identical content by comparing respective first and second hash values, different from the page signatures, computed over the first and second memory pages.

12. The system according to claim 7, wherein the processors are configured to classify the memory pages into active and inactive memory pages, and to include in the memory chunks only the inactive memory pages.

13. A computer software product, the product comprising a tangible non-transitory computer-readable medium in which program instructions are stored, which instructions, when read by a plurality of processors of respective compute nodes, cause the processors to run clients that access memory pages stored in memories of the compute nodes, to define memory chunks, each memory chunk comprising multiple memory pages accessed by a respective client, to compute respective similarity-preserving signatures for two or more of the memory chunks, to identify, based on the similarity-preserving signatures, memory chunks that differ in content in no more than a predefined number of memory pages with at least a predefined likelihood, and noting first and second clients on different computing nodes, accessing the identified memory chunks, and to migrate the first client to the compute node hosting the second client or to a compute node that are topologically adjacent in the computing system to the compute node hosting the second client, responsively to identifying the memory chunks that differ in content in no more than a predefined number of memory pages with at least a predefined likelihood.

14. The method according to claim 1, wherein migrating the first client comprises migrating the first client to the compute node hosting the second client.

15. The method according to claim 1, wherein migrating the first client comprises migrating the first client to a compute node topologically adjacent to the compute node hosting the second client.

* * * * *